Nov. 24, 1959 A. MEYER 2,914,407
PROCESS AND APPARATUS FOR PRODUCING VARIABLE
AREA RECORDS ON LENTICULAR FILMS
Filed Dec. 23, 1953

INVENTOR
ARMIN MEYER
BY *Hendroth, Lind & Ponack*
ATTORNEYS

United States Patent Office 2,914,407
Patented Nov. 24, 1959

2,914,407

PROCESS AND APPARATUS FOR PRODUCING VARIABLE AREA RECORDS ON LENTICULAR FILMS

Armin Meyer, Basel, Switzerland, assignor to Ciba Limited, Basel, Switzerland, a firm of Switzerland Application December 23, 1953, Serial No. 399,927

Claims priority, application Switzerland December 23, 1952

3 Claims. (Cl. 96—45)

It is known that films having a lenticular grating are very suitable for all photographic processes which involve the production of different partial pictures, for example, the color records of a color picture or different stereoscopic views of the same picture, in a recording layer in such manner that the partial pictures can be subsequently combined together additively, for example, by projection. It is necessary that the whole photographic record be divided up into picture elements corresponding to the width of the lenticulations of the grating.

In many of the usual photographic processes, especially in those that do not involve splitting up the picture into numerous elements, the production of the photographic record depends on the fact that the blackening produced corresponds to the quantities of light producing the record. This method is usually called continuous tone recording. The present invention uses a fundamentally different method for producing the record. The process of this invention splits up the whole picture into picture elements, and so regulates the transparency of these picture elements relatively to one another in accordance with the incident light that in each of the elements in the record one part of the area of the said element is practically opaque and the remaining part is practically completely transparent. Whereas this method is usually called variable area recording it happens to be spoken of as half tone recording in contrast to the continuous tone recording referred to above. This method of recording requires, on the one hand a splitting up of the light, which during exposure for example, especially in copying a negative, has a suitable gradation in each individual picture element, and also a method of development producing a high gamma value. Under these conditions development can be carried out in such manner that, depending on the amount of light falling on an individual picture element, a larger or smaller portion of the area of the picture element is practically opaque after the development, while the rest of the area remains wholly transparent.

In applying this method to films having lenticular gratings difficulty arises, because the small picture elements produce under the influence of such relatively small amounts of light a complete blackening that does not correspond to the whole range of contrast to be recorded. The U.S. Patent No. 2,750,590 (application Serial No. 255,603, filed November 9, 1951), describes a process for recording on lenticular films in accordance with the principle described above, which overcomes the aforesaid difficulty by the use of a filter of which the transparency varies in every direction over the whole surface of the filter. Images of this filter can be formed in the record layer, for example, by the use of a film of which the grating is composed of spherical lenticulations or by using two crossed gratings having cylindrical lenticulations.

The present invention overcomes the aforesaid difficulty in another manner.

This invention is based on the observation that variable area records can be produced on lenticular films having a light-sensitive layer, which is developed to a high gamma value, by producing in strips longitudinally of the axes of the lenticulations a primary light distribution which within each strip diminishes from a maximum at the edges of the strip to a minimum in the middle of the strip, and by influencing this light distribution, on the one hand, by the picture to be copied and, on the other, by a line screen disposed approximately in the plane of the film with its lines extending transversely to the axes of the lenticulations.

The primary light distribution, that is to say, the light distribution which would be produced, for example without the interposition of the picture to be copied, can be produced in a simple manner by means of suitable diaphragms. Care must be taken that the illumination of these diaphragms is sufficient to produce a uniform light distribution over the whole of the film to be copied. Suitable methods to enable a high gamma value to be obtained in copying and development are described, for example, in U.S. Patent No. 2,689,792 (application Serial No. 218,893, filed April 2, 1951).

Of special importance in the present process is the line screen disposed approximately in the plane of the film. The lines of this screen must extend transversely to the axes of the lenticulations of the film. Owing to the transverse arrangement the picture elements, which are limited only in one direction by the lenticulations, are also limited in the other direction. Moreover, the primary light distribution is not influenced only by the picture to be copied, but also by the lines of the line screen. Depending on the widths of the individual lines, their optical transparency and their distance from the plane of the lenticular film, the light distribution within the individual elements is so varied that the growing together of the record occurs at higher light intensities than would be the case without the interposition of the line screen.

The invention is further described with reference to the accompanying drawings:

Fig. 1 shows in perspective the course of the light rays through three diaphragm apertures and a cylindrical lenticulation of a lenticular film, Figs. 2 and 3 each show a plan view of a diaphragm, Fig. 4 shows a plan view of another form of diaphragm, Fig. 5 is a graph of the light distribution in the zones shown in Fig. 1, Fig. 6 shows in perspective a line screen film associated with a lenticular film.

Figure 1:
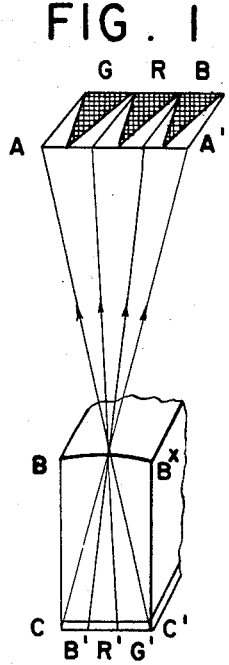

In the lower part of Fig. 1 is shown a section through a cylindrical lenticulation of a lenticular film. The cylindrical lenticulation $BB^x$ casts images of the three diaphragm apertures G, R and B in the plane AA' of the diaphragm shown in the upper part of the figure, these images being formed in the plane CC' of the record, in which lies the light-sensitive layer. The three record zones G', R' and B' are exposed in this layer. The plane AA' of the diaphragm coincides with the plane of the filter during the projection of the lenticular film. In the figure the distance AB is shown very much too short in relation to the distance BC.

The three diaphragm apertures R, G and B must take the form of uniformly bright areas in the copying apparatus. Thus, it must be arranged that the light from all points of the three diaphragm apertures, R, G and B reaches all points of the lenticular film within the picture area of the copying apparatus with substantially equal intensity.

Figure 2:
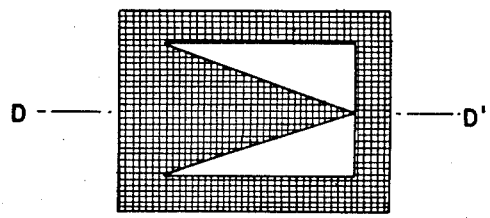
Figure 3:
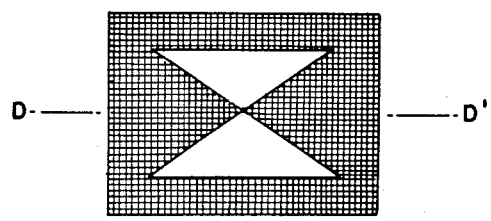
Figure 4:
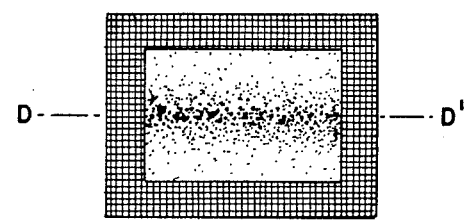

At the positions R, G and B there may be inserted diaphragms as shown, for example, in Fig. 2, 3 or 4. In the diaphragms shown in Figs. 2 and 3 the black areas are opaque.

Fig. 4 shows a double wedge of varying density, which becomes lighter on both sides of the centre line DD'. The diaphragms must extend parallel to the cylindrical lenticulations in the direction DD'.

Figure 5:
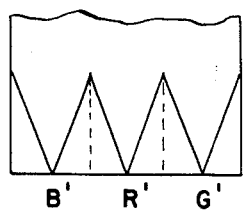

Fig. 5 shows the resulting primary light distribution in the form of a graph in which the values for light intensity are shown as extending transversely of the record zones G', R' and B'. When the record layer is subsequently developed to a very steep gamma value (for example $\gamma=10$), black strips are formed at the edges of the three record zones B', R' and G', which become wider as the intensity of the light rays increases or as the exposure time is prolonged and finally merge into one another.

Figure 6:
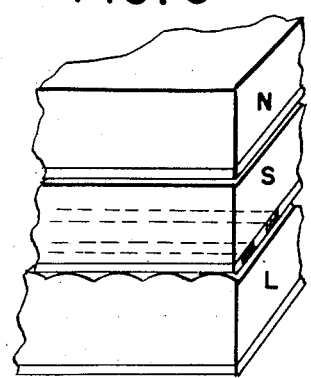

The width of the lenticulations, which is limited by the desired resolving power of the film, may be about $36\mu$ (28 lenticulations per millimeter). Consequently each record zone (G', R' or B') has a width of $12\mu$. Thus, at an optical density of 1 (transparency=10%) the black strips growing inwardly from the edges of each record zone will have approached each other up to a distance of $1.2\mu$. This dimension corresponds approximately to the resolving power of the lenticular grating and so represents the upper limit of the variable range. For practical purposes, however, a range of density from 0 to 1 is insufficient. A range of about 0 to 2 is desired. In accordance with the invention this increase in range is brought about by arranging the lenticular grating in contact with a line screen, of which the lines extend at a right angle to the cylindrical lenticulations of the lenticular film. This arrangement is shown in Fig. 6, in which N is the negative to be copied, S the line screen and L the lenticular film. The distance between adjacent lines measured from centre to centre is of the same order as the width of a lenticulation, and the width of each line is of the order of ½ to ⅛ of the width of a lenticulation or of the distance between adjacent lines. Advantageously, the lines should have an optical density of at least 1. However, there may be used a line screen wherein the individual lines have a continuous density variation extending in a direction transversely of the lines, that is to say, in the longitudinal direction of the lenticulations. During the exposure of the three record zones G', R' and B' (Fig. 1) the intensity of the light beneath the lines of the screen is considerably less than it is between the lines. Thus, the edges of the record zones G', R' and B' lying beneath the lines of the film carrying the line screen are blackened only at the higher light intensities. In other words the resulting blackening grows inwardly at considerably higher intensities in these places than it does between the lines.

Figure 7:
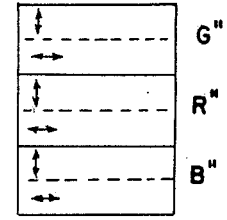
Fig. 7 shows in plan a developed record.

Fig. 7 shows picture elements resulting from exposure and development. In this figure B' represents a weak exposure, R' a medium exposure and G' a strong exposure, which correspond, respectively, to high, medium and low densities in corresponding parts of the negative. By virtue of the partial shading of the diaphragms shown in Figs. 2–4, which is dependent on (1) The length DD' of the diaphragms,
(2) The width of the screen lines, and
(3) The distance of the screen lines from the record plane CC' (Fig. 1), and owing to a slight scattering of the light, the blackened places, even when a non-varying line screen is used are not rectangular but rounded. However, this has no harmful effect. By the use of a varying line screen the form of the blackened places can be influenced.

By means of this recording system negatives can be copied on to lenticular films in known manner. In the case of an optical copy the diaphragm, plane AA' in Fig. 1 is disposed in the exit pupil of the objective, whereas in contact copying the negatives, advantageously three negatives each containing one of the three primary color records, green, red and blue, are placed in succession on the line screen (S in Fig. 6). Thus, for example, the green negative is first exposed through the diaphragm aperture G (Fig. 1), then the red record through R and finally the blue record through B. There are used with advantage negatives having a density range (difference between the highest and lowest optical densities) of at most about 1 (transparency ratio=1:10). The negatives should scatter the light as little as possible. Especially suitable are images of colloidal silver or dyestuffs.

In the copying process described above the resulting gradation curves can be influenced in two ways: Firstly, by the primary light distribution due to the diaphragms placed in the diaphragm plane AA' (the form of the opaque diaphragms or the density variation of a light-absorbing filter which may, if desired, be non-linear so as to correct error arising elsewhere, for example, in the slope of the gradation curve, and also the lengths of the diaphragms or filters in the direction DD' in Figs. 2–4), and, secondly, by variations in the line screen (widths of the lines, the distribution of blackening over the widths of the lines, the number of lines per millimeter, distance of the line screen from the record plane CC' in Fig. 1). The resulting gradation curve of the copy is also dependent on the quality of the lenticulations. In order to attain a desired gradation the copying diaphragms or filters, the line screen and the lenticular grating must be suitably matched with one another.

Figure 8:
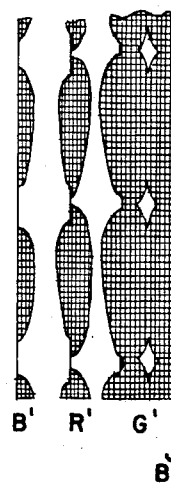
Fig. 8 shows the arrangement of the polarization planes in the projection of stereoscopic color pictures.

The system of recording described above is also suitable for the reproduction of stereoscopic color pictures. for this purpose one half of each of the three record zones B', R' and G' (Fig. 7), records the left-hand picture and the other half the right-hand picture. Six negatives must be copied in succession on to the same lenticular film, namely red, green and blue records of the left-hand picture and red, green and blue records of the right-hand picture. For copying the left-hand picture, for example, the upper halves of the diaphragms (Figs. 2–4) are covered and for copying the right-hand picture the lower halves are covered. In projecting such a film there are placed two polarization filters in front of each of the three red, green and blue projection filters, as shown in Fig. 8, so that the plane of polarization of the light which passes through one half of each color filter is at a right angle to the plane of polarization of the light which passes through the other half of each color filter. Pictures projected in this manner must, as is known, be viewed through polarizing spectacles.

In the recording system described above the line screen need not be placed mechanically upon the negative but may be optically superimposed on the negative. For this purpose a special copying process is necessary in order to copy a line screen on to each of the three negative films in addition to the picture. The interposition of a line screen film between the negatives and the lenticular film can be avoided in another way, namely, by superimposing the line screen photochemically on the actual record layer of the lenticular film. Thus, the sensitivity to light of the record layer can be varied locally by special treatment. For example, tanned zones can be produced in the gelatine layer of a lenticular film by suitable photochemical treatment, the zones extending transversely to the lenticulations and being of reduced sensitivity to light. The action of such tanned lines is the same as when a line screen is interposed between the negative and the copy.

The following example illustrates the invention:

*Example*

As starting material there is used a film upon one side of which is cast a gelatine layer about $5\mu$ thick. Lenticulations which extend transversely to the film are impressed on the opposite side by embossing (28 lenticulations per millimeter). The gelatine is then sensitized with the following solution:

290 cc. of distilled water,
4 cc. of a solution of 10 percent strength of a condensation product of a fatty alcohol with more than 6 mols of ethylene oxide,
26 grams of ferric ammonium citrate,
9.2 grams of citric acid,
100 cc. of silver nitrate solution of 10 percent strength.

After the sensitisation the embossed side is washed with distilled water.

Preparation of the line screen: A film having no embossing and upon which is cast a gelatine layer of about $5\mu$ thick is sensitized in the manner described above, and placed in contact with a lenticular film having no gelatine layer and of which the lenticulations (for example, 25 lenticulations per millimeter) extend longitudinally of the film. The sensitized layer is placed against the smooth side of the lenticular film. The sensitized layer is then exposed through the lenticular film, the light passing through a slotted diaphragm 8 millimeters wide extending parallel to the lenticulations and arranged at a distance of 20 centimeters from the film. As the slotted diaphragm extends parallel to the lenticulations, there are visible on the sensitized non-embossed film, after suitable physical development, lines having a width of about $7\mu$. The resulting widths of the lines are also dependent on the exposure time, since the lenticulations are unable to form completely sharp images of the slotted diaphragm. Before the physical development, the film is maintained for about 15 minutes in air having a relative humidity of 90–100 percent. Immediately before use the physical developer is prepared by mixing a silver nitrate solution with a metol-tartaric acid solution. The developing operation is as follows: Treatment for 5 minutes in distilled water, and then for one minute in a developer prepared by mixing 200 cc. of a solution of 20 grams of metol
80 grams of tartaric acid
20 cc. of a solution of 10 percent strength of the condensation product of para-tertiary octyl-phenol with about 8 mols of ethylene oxide,
2000 cc. of distilled water, with
10 cc. of a silver nitrate solution of 10 percent strength.

The film so developed is hardened for 3 minutes in a chrome alum solution of 5 percent strength, and fixed for 3 minutes in a sodium thiosulfate solution of 5 percent strength. Washing is carried out between and after the treatments in the various baths.

The copying of separation negatives on to the lenticular film: Prior to copying, three duplicate negatives are copied on to non-embossed film sensitized in the manner described above. They are physically developed in such manner that in ultraviolet light (3500 to 4000 Angstrom) they have a density range of less than one (transparency equals 1:10). For this purpose the same development process is used as in the case of the line screen film. However, development can be more easily controlled by using a more dilute developer. The developer is prepared by mixing 200 cc. of a solution of 5 grams of metol
80 grams of tartaric acid
20 cc. of a solution of 10 percent strength of the condensation product from para-tertiary octyl-phenol with about 8 mols of ethylene oxide
2000 cc. of distilled water, with
10 cc. of silver nitrate solution.

Washing before development may be dispensed with. The three separation negatives are then copied in succession on to the lenticular film, the copying light first passing through a diaphragm such as is shown in Fig. 2 arranged at a distance of 20 centimeters from the negative film. The three films (negative, line screen and lenticular film) are superposed in the manner shown in Fig. 6, that is to say, the light passes through the negative N and line screen S into the lenticular film L. A device is provided which enables the diaphragms to be brought into the three positions G, R and B shown in Fig. 1 which correspond to the three negatives for green, red and blue. The lenticular film is then physically developed to a very steep gamma value ($\gamma$=approximately 10). For this purpose the procedure may be as described in U.S. Patent No. 2,689,792 (application Serial No. 218,893, filed April 2, 1951).

If desired, after the physical development, the image may first be reduced somewhat and then treated with gold chloride and platinous chloride (combined gold-platinum toning bath).

The desired gradation is obtained, for example, in the following manner:

Treatment first for 5 minutes in distilled water, then 6 minutes in the physical developer used for producing the line screen film. Then follow a hardening bath and a fixing bath as in the case of the line screen film. This is followed by treatment in a gold bath, which has been prepared by mixing 200 cc. of a solution of 10 grams of anhydrous sodium acetate
10 grams of borax
1000 cc. of distilled water, with
10 cc. of gold chloride solution of 1 percent strength The period of treatment is 1½ minutes. The film is then immersed for 20 minutes in a solution consisting of 0.2 gram of potassium platinochloride
15 grams of phosphoric acid (density=1.12)
120 cc. of distilled water It is then treated for 5 minutes in a solution consisting of 2.5 grams of sodium hydrosulfite
5 grams of sodium carbonate
100 cc. of water Washing is carried out between and after the individual baths.

Duplicate negatives of the color records consisting of dyestuff images free from scatter can be prepared as follows:

Color record negatives, of which the image is composed of silver grains, produced with ordinary commercial negative films (for example, Kodak Plux X) are copied by contact on to a fine grained film (for example, Eastman fine grain duplicating positive safety film) while maintaining as accurate a registration as possible. The exposed films are treated in a developer containing in one litre 0.2 gram of monomethyl-para-aminophenol sulfate
15.0 grams of anhydrous sodium sulfite
1.8 grams of hydroquinone
6 grams of anhydrous sodium carbonate
1 gram of potassium bromide and the development is carried on for 5 minutes at 21° C. The material is then immersed for a short time in acetic acid of 1.5 percent strength, and is then fixed in a rapidly acting fixing bath which contains, per liter, 240 grams of sodium thiosulfate
15 grams of anhydrous sodium sulfite
15 grams of acetic acid of 10 percent strength
7.5 grams of boric acid
15.0 grams of aluminum alum at a temperature of 20° C. After being washed for 30 minutes, the film is dyed in a dyestuff bath containing, per liter 2.5 grams of the dyestuff of the formula

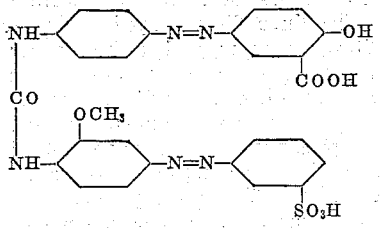

(in the form of the sodium salt)

0.5 gram of a wetting agent obtained from 1 mol of para-tertiary octyl-phenol and about 8 mols of ethylene oxide at a temperature of 28° C. for 15 minutes with occasional agitation. After being immersed for a short time in water, the dyestuff is fixed by treatment for 5 minutes with a precipitating bath which contains, per liter of water 5 grams of 2-naphthyl-biguanide hydrochloride, and
0.5 gram of the wetting agent mentioned above.

After being immersed for a short time in water, the surface of the film is cleaned by washing it with a moist chamois leather, and is then treated at 18° C. for 10 minutes with a color bleaching bath of the following composition:

25 grams of sodium chloride
25 grams of potassium bromide
40 cc. of pure concentrated hydrochloric acid
0.005 gram of 2-amino-3-hydroxyphenazine hydrochloride
0.5 gram of the wetting agent mentioned above, dissolved in one liter of water.

After a short intermediate washing operation the silver picture is bleached by immersion for 2 minutes in a bath maintained at 20° C., which contains, per liter of water, 100 grams of sodium chloride
100 grams of crystalline copper sulfate
50 cc. of concentrated hydrochloric acid, and
0.5 gram of the wetting agent mentioned above.

After an intermediate washing operation lasting two minutes, fixation is carried out in a sodium thiosulfate bath of the composition given above. The film is then cleaned with a moist chamois leather, and finally washed for 5 minutes, then rinsed in distilled water, which contains per liter 0.5 gram of the wetting agent mentioned above, and dried in a current of air.

The silver bleaching-out process described above yields directly from the original negative three corresponding duplicate negatives, of which the image consists of the incorporated dyestuff. The degree of dispersion of the dyestuff forming the image almost completely precludes harmful scattering of the copying light, and there can be obtained therefrom intermediate copies which can be used with advantage in contact copying methods.

What is claimed is:

1. A process for the production of variable area recordings on lenticular film comprising the steps of employing a transparent sensitized photographic element having a sensitized layer on one side and cylindrical lenticulations on the side opposite the sensitized layer and which after exposure may be developed to a high gamma value; placing in direct contact with the cylindrical lenticulations a line screen having directed at right angles to the direction of the cylindrical lenticulations opaque and transparent strips, the width of the transparent portion being from ½ to ⅞ the distance between adjacent lines from center to center; placing over said line screen a negative record to be recorded on the sensitized photographic element; illuminating said sensitized layer through said line screen and said negative record by means of a diaphragm illuminated by a light source; and developing the material thus exposed to a high gamma value; said diaphragm decreasing in total opacity along lines parallel to a central line from said central line toward opposite sides, the central line being parallel to the cylindrical lenticulations, and said diaphragm being focused by said lenticulations onto said sensitized layer.

2. A process as claimed in claim 1, wherein the distance between the lines from center to center of the line screen is of approximately the same order as the width of the lenticulations.

3. A process as claimed in claim 1, wherein the individual lines of the line screen are of varying blackening in the direction transversal to the direction of the lines.

References Cited in the file of this patent

UNITED STATES PATENTS

| 2,151,301 | Percy | Mar. 21, 1939 |

FOREIGN PATENTS

| 245,118 | Great Britain | June 20, 1927 |
| 696,105 | France | Oct. 7, 1930 |
| 750,156 | France | May 22, 1933 |